United States Patent

Eckel et al.

[11] Patent Number: 5,106,199
[45] Date of Patent: Apr. 21, 1992

[54] MIXER TOOL FOR AN ICE-CREAM MAKER

[75] Inventors: Merowech Eckel, Klagenfurt; Wolfgang Ramusch, Brückl/Kärnten, both of Austria

[73] Assignee: U.S. Philips Corp., New York, N.Y.

[21] Appl. No.: 730,519

[22] Filed: Jul. 12, 1991

Related U.S. Application Data

[63] Continuation of Ser. No. 263,993, Oct. 25, 1988, abandoned, which is a continuation of Ser. No. 880,773, Jul. 1, 1986, abandoned.

Foreign Application Priority Data

Jan. 16, 1986 [AT] Austria .................. A93/86

[51] Int. Cl.$^5$ .............................. B01F 7/18
[52] U.S. Cl. .......................... 366/147; 366/251; 366/313; 366/343
[58] Field of Search .............. 366/147, 312, 313, 245, 366/247, 249, 251, 343; 99/348, 455; 62/340, 342, 343

[56] References Cited

U.S. PATENT DOCUMENTS

| | | | |
|---|---|---|---|
| 2,793,505 | 5/1957 | Finch | 366/312 |
| 3,188,677 | 6/1965 | Jamison | 366/313 |
| 3,465,540 | 9/1969 | Carpigiani | 366/312 |
| 3,738,619 | 6/1973 | Shirae | 366/312 |
| 4,070,957 | 1/1978 | Korekawa et al. | 99/455 |
| 4,183,680 | 1/1980 | Manfroni | 366/312 |
| 4,205,535 | 6/1980 | Maurer | 62/342 |
| 4,655,605 | 4/1987 | Cipelletti | 366/312 |

*Primary Examiner*—Frankie L. Stinson
*Attorney, Agent, or Firm*—Ernestine C. Bartlett

[57] ABSTRACT

A mixer tool (8) for an ice-cream maker is provided which is insertable centrally into a cylindrical container (1) of the ice-cream maker and is operable there in rotation and which has at least one scraper (12, 13) projecting from a central shaft (6) and acting with the walls of cold cartridge 3 through its scraper edges (16, 17) and which also has at least one stirrer (14, 15) projecting from a central shaft (6), effective at least in the vicinity of the container wall (7), the stirrer effecting in the container flow at least directed from bottom to top of an ice-cream mixture filled into the latter. The stirrer also has at its free upper end close to the container wall a knife-shaped scraper (20, 21) projecting over the stirrer and acting together with the container wall to prevent formation of ice cream deposits above the stirrer.

2 Claims, 1 Drawing Sheet

MIXER TOOL FOR AN ICE-CREAM MAKER

This is a continuation of application Ser. No. 07/263,993, filed Oct. 25, 1988, now abandoned which is a continuation of application Ser. No. 06/880,773 filed July 1, 1986 now abandoned.

The invention relates to a mixer tool for an ice-cream maker, which is insertable centrally into a cylindrical container of the ice-cream maker and is operable there in rotation and which has at least one stirrer projecting from a central shaft, effective at least in the vicinity of the container wall. The stirrer effects in the container a flow directed at least from bottom to top of an ice-cream mixture filled into the latter. This kind of mixer tool for an ice-cream maker which is used as a domestic appliance has been previously disclosed in DE-OS 31 19 971. The requirements made of such a mixer tool are that it mixes well and continuously an initially fluid ice-cream mixture poured into the container during the formation of the ice-cream. The mixer tool must scrape off any ice-cream forming on the container wall, the container base, or on a cold cartridge inserted into the container and mix it again uniformly into the ice-cream mixture, so that ice-cream is produced efficiently with a uniform consistency. Accordingly, such a mixer tool usually has several sections which, designed to be effective as scrapers and as stirrers.

SUMMARY OF THE INVENTION

The object of the invention is to further improve a mixer tool of the aforementioned type in order to achieve an even more efficient production of ice-cream. According to the invention there is provided on the stirrer at its free upper end close to the container wall, a knife-shaped scraper projecting over the stirrer and acting together with the container wall. In this way it is ensured that none of the ice-cream mixture transported from bottom to top by the stirrer can be deposited above the free upper end of the stirrer on the container wall and freeze there as non-ready ice-cream. Such deposits are continuously removed by the scraper provided on the stirrer according to the invention and returned to the remaining ice-cream mixture in the container. The mixing and stirring effect of the stirrer is not therefore adversely affected, since due to its knife-shaped and relatively narrow design the additional scraper solely causes a scraping effect, without influencing the flow of the ice-cream mixture effected by the stirrer itself in the container.

It should be mentioned at this point that mixer tools for an ice-cream maker are already known from EP-OS 0 091 825 and FR-PS 1 019 664, in which stirrers, which effect inside the container a flow directed from bottom to top of an ice-cream mixture filled into the latter, are provided at their free upper end close to the container wall with an inclined, projecting, paddle-shaped extension which serves to divert the ice-cream mixture transported from bottom to top in the vicinity of the container wall and to guide it back into a flow of the ice-cream mixture directed downwards. As a result of this, however, the flow of the ice-cream mixture intentionally directed from bottom to top by the stirrer is disturbed, which results in turbulence which can adversely affect the uniform mixing of the ice-cream mixture, which may result, for example, in the formation of lumps in the ice-cream. In contrast, the additional scraper provided on the stirrer according to the invention has no influence on the flow of the ice-cream mixture effected by the stirrer, but only scrapes off any ice-cream mixture which may have collected above the free upper end of the stirrer on the container wall and thus guides it back into the remaining ice-cream mixture in the container. There is thus no adverse influence on the uniformity of the mixing of the ice-cream mixture.

According to a preferred embodiment of the invention, there is provided a mixer tool for an ice-cream having a cylindrical container with vertical walls, wherein the mixer tool is insertable centrally into and cooperates with said cylindrical container of the ice-cream maker and is operable there in rotation and which mixer tool has a central shaft and at least one scraper projecting from the central shaft and acting with a cold cartridge of the ice-cream maker located beneath said scraper, at least one vertical stirrer projecting from and above the scraper and having an upper free end, effective at least in the vicinity of a vertical container wall of the ice-cream maker, said stirrer effecting in the ice-cream maker container a flow at least directed from bottom to top of an initially fluid ice-cream mixture filled into the container, said vertical stirrer including at its free upper and close to the vertical container wall at least one knife-shaped scraper projecting over the at least one vertical stirrer and acting together with the vertical container wall, preventing and continuously removing formation of ice-cream deposits above the free upper end of said at least one vertical stirrer without adversely affecting the flow of the ice-cream mixture and uniformity of the mixing effected by the at least one vertical stirrer.

The mixer tool may comprise two vertical stirrers in the form of angled vertical stirrers, which together with the scraper which projects from said shaft form L-shaped angled vertical stirrers, said L-shaped angled vertical stirrers projecting from the central shaft, each of said L-shaped angled vertical stirrers having at its upper free end a knife-shaped scraper acting with the vertical container wall, each said knife-shaped scraper having an edge interacting with the vertical container wall in any direction of rotation of said mixer tool.

BRIEF DESCRIPTION OF THE DRAWINGS

The invention will be described in further detail with reference to the diagram which shows an embodiment of the invention, to which it should not however be restricted.

DESCRIPTION OF THE PREFERRED EMBODIMENT

Figure 1:
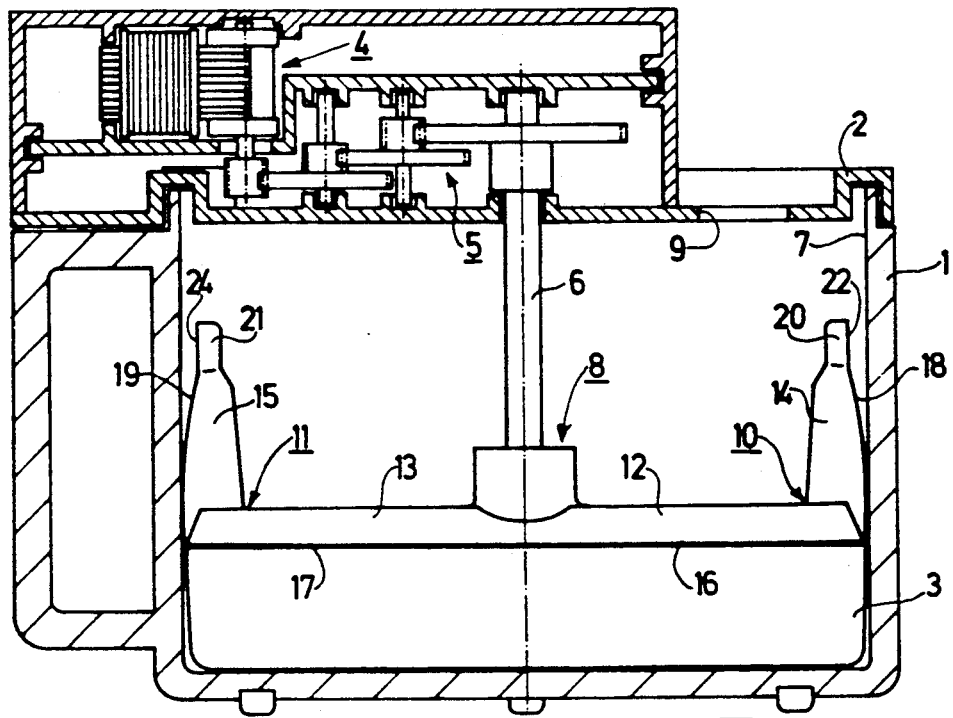
FIG. 1 shows an ice-cream maker with a mixer tool according to the invention partially in section in side elevation.

In FIG. 1 a thermally insulated cylindrical container is indicated with 1, which is closable by means of a suitably lockable cover 2 provided on it. Into the container 1 a discoid cold cartridge 3 is inserted which contains the latent heat storage medium. The cover 2 accommodates an electric motor 4, which via a gear unit 5, which in this case takes the form of a three-step toothed-wheel gearing drives a shaft 6 running central to the container 1 and bearing a mixer tool 8 acting together with the cold cartridge 3 and the container wall 7. If required, the electric motor 4 may constitute together with the gear unit 5 an assembly unit separable from the lid 2. The shaft 6 may also be releasable from the gear unit along with the mixer tool by means of a plug connection. A spring arrangement may also be provided between the gear unit 5 and the shaft 6, which keeps the mixer tool under spring pressure against the cold cartridge 3, so as to permit the scraping off of ice-cream forming on the cold cartridge to occur as efficiently as possible.

Prior to the use of the ice-cream maker the cold cartridge 3 is cooled for example in the freezer compartment of a refrigerator and subsequently inserted into the container 1. The cover 2 with the mixer tool 8 is then placed into the container 1, after which an ice-cream mixture is poured into the filling opening 9 provided in the cover 2. After switching on the electric motor the mixer tool 8 begins to turn, whereby the ice-cream mixture is mixed and any ice-cream forming on the cold cartridge is scraped off and mixed back into the ice-cream mixture. This continues until only ice-cream with the required temperature and consistency remains.

Figure 2:
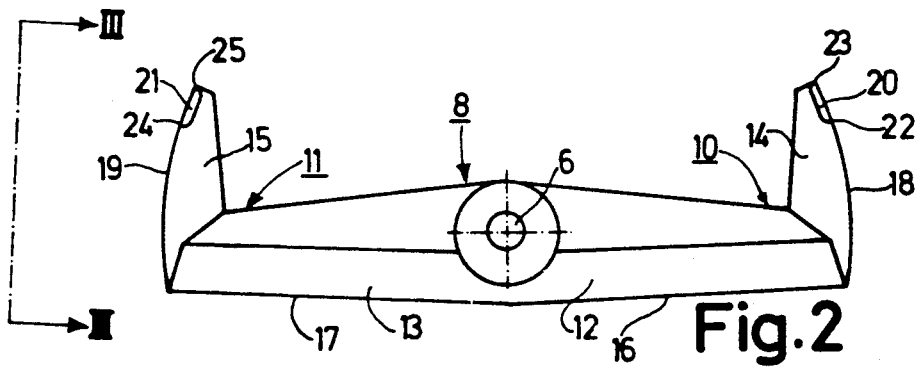
FIG. 2 shows the mixer tool of the ice-cream maker according to FIG. 1 in plan view.
Figure 3:
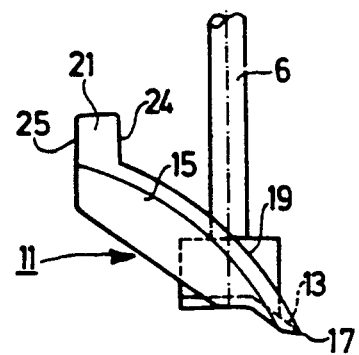
FIG. 3 shows the mixer tool according to FIG. 2 in side elevation along the line III—III in FIG. 2.

In this ice-cream maker an autosynchronous single-phase motor is provided as the electric motor 4 which is capable with relatively small dimensions of offering a relatively high performance. It is known that the direction of rotation in which a single-phase synchronous motor starts up is not fixed, so that the shaft 6 can be driven in one of the two directions of rotation Accordingly, the mixer tool 8 has for both directions of rotation of the shaft 6 in each case at least one L-shaped mixer tool section, 10 and 11 respectively, effective principally in the relevant direction of rotation. In this particular embodiment such a mixer tool section 10 and 11 positioned mirror-inverted to the shaft 6 is provided for each of the two directions of rotation of the shaft, as shown in FIG. 2. Each of these mixer tool sections 10 and 11 has a scraper, 12 and 13 respectively, projecting from the shaft 6 and acting together with the cold cartridge and which together with one angled stirrer, 14 and 15 respectively are L-shaped and effect a mixing and stirring of the ice-cream mixture and also has a scraping effect acting together with the container wall 7. As can be seen from FIG. 2, the edge 16 of the scraper 12 lies foremost when the mixer tool 8 is rotating in the clockwise direction, whereas in anticlockwise rotation the edge 17 of the scraper 13 lies foremost, so that in the former case the edge 16 and in the latter case the edge 17 effects the scraping off of the ice-cream forming on the cold cartridge. The same applies to the edges 18 and 19 of the stirrers 14 and 15, which act together with the container wall 7 and scrape off any ice-cream forming there. The edge 18 of the stirrer 14 is thereby effective as a scraping edge when the mixer tool 8 is rotating in the clockwise direction and the edge 19 of the stirrer 15 effective when rotating in the anticlockwise direction. The stirrers 14 and 15 are also positioned mirror-inverted to the shaft 6 and in particular in this embodiment in relation to the relevant direction of rotation from bottom to top and to the inside of the container have the form of an inclined, flat blade. In this way each of the two stirrers 14 and 15 i.e. the stirrer lying foremost for the relevant direction of rotation, effects a flow of the ice-cream mixture directed from bottom to top and in this case also towards the center of the container in one of the two directions of rotation of the shaft 6, since the ice-cream mixture moves from the bottom upwards on the relevant stirrer. In the direction of rotation in question the other stirrer lying behind then effects a flow of the ice-cream mixture essentially in the reverse direction from top to bottom towards the cold cartridge 3 and the container wall 7. In this way a uniform mixing of the ice-cream mixture and a uniform production of ice-cream is achieved overall. Other designs of the stirrers are of course also possible, in order to achieve the flow of the ice-cream mixture which is required in each case. Thus the stirrers may, for example, also be designed with a convex or helical shape with respect to the relevant direction of rotation. It is also possible to provide for each direction of rotation of the shaft 6 more than one section 10 or 11 of the mixer tool effective principally in the relevant direction of rotation, which would then have to be arranged with corresponding angular displacement on the shaft 6.

As can be seen from the diagrams, each of the two stirrers 14 and 15 also has at its free upper end in the vicinity of the container wall 7 a knife-shaped scraper 20 and 21 projecting above the stirrer and acting together with the container wall 7. As can be seen in particular from FIG. 2, these additional scrapers 20 and 21 are formed by panel-shaped projections running parallel to the generatrix of the container wall 7, their side edges being bevelled in the shape of a blade towards the container wall 7. In this way a scraper edge, 22 and 23, and 24 and 25 respectively, is formed on each of the two scrapers 20 and 21 for both directions of rotation of the mixer tool 8, said edges interacting with the container wall 7.

These scrapers 20 and 21 provided additionally on the stirrers 14 and 15 serve to ensure that none of the ice-cream mixture transported from bottom to top by the relevant stirrer can be deposited above the free upper ends of the stirrers 14 and 15 on the container wall 7 and freeze there, since it is continually scraped off by the additional scrapers 20 and 21 and is thus fed back into the remaining ice-cream mixture in the container. Due to the knife-shaped and thus relatively narrow design of the scrapers 20 and 21 it is ensured that the flow of the ice-cream mixture caused by the relevant stirrer from bottom to top and in this case also into the centre of the container is not restricted or prevented. On the whole therefore this type of mixer tool effects an efficient mixing and stirring of the ice-cream mixture and an efficient formation of ice-cream with uniform consistency, without any ice-cream mixture being able to form on the container wall above the mixer tool.

There is of course a range of further possibilities for the design and/or shaping of the scrapers 20 and 21 additionally provided on the stirrers 14 and 15. These scrapers may thus have different cross sections for the formation of the scraping edges, such as for example in the form of a circular segment, or with only one scraper edge for the relevant direction of rotation. The scrapers may also be bevelled or crescent-shaped.

What is claimed is:

1. A mixer tool (8) for an ice-cream maker, which tool is insertable centrally into a cylindrical container (1) of the ice-cream maker and can be driven to rotate therein and which has at least one scraper (12, 13) projecting from a central shaft (6) and acting with a cold cartridge (3) of the ice-cream maker located beneath said scraper, a stirrer (14, 15) operative at the location of the container wall (7) being arranged at an end of the scraper which is remote from the central shaft and producing in the container in an ice-cream mixture filled into said container a flow at least directed from bottom to top, which stirrer is arranged to be inclined relative to the central shaft (6) and has a free upper end and a scraping edge (18, 19) which is inclined relative to the central shaft and cooperates with the container wall, characterized in that at its free upper end the stirrer (14, 15) in addition comprises an additional scraper (20, 21) which projects above the stirrer and has a knife-shaped additional scraping edge (22, 24) cooperating with the container wall (7), extending parallel to the axis of the central shaft, and forming an angle with the scraping edge (18, 19) of the stirrer.

2. A mixer tool as claimed in claim 1 having two angled vertical stirrers (14, 15) which together with two scrapers (12, 13) form two L-shaped angled vertical stirrers, said stirrers in addition comprising an additional scraping edge (22, 24) cooperating with the container wall (7), extending parallel to the axis of the central shaft, and forming an angle with the scraping edge (18, 19) of the stirrer, each said edge (22, 24) interacting with the vertical container wall (7) in any direction or rotation of said mixer tool.

* * * * *